United States Patent Office 3,519,493
Patented July 7, 1970

3,519,493
METAL COATING COMPOSITIONS
Eugene R. Farone, Mentor-on-the-Lake, Ohio, assignor to The Lubrizol Corporation, Wickliffe, Ohio, a corporation of Ohio
No Drawing. Filed Apr. 17, 1967, Ser. No. 631,133
Int. Cl. C23f 7/08
U.S. Cl. 148—6.15   6 Claims

ABSTRACT OF THE DISCLOSURE

Metal coating compositions are prepared by mixing a polymeric polyol (preferably a styrene-allyl alcohol copolymer), an epoxy resin, phosphoric acid, and a thermosetting phenol-aldehyde resin. They impart an attractive color, ranging from gold to dark walnut, to the coated surface, the shade depending on curing time and temperature.

---

This invention relates to compositions for coating metal surfaces, and more particularly to a liquid composition of matter, suitable for providing a protective film on a metal surface, which comprises (A) about 15–20 parts by weight of a polymeric polyol, (B) about 1–50 parts of an epoxy resin, (C) about 2–40 parts of phosphoric acid, and (D) about 5–60 parts of a solid phenol-aldehyde resin which is capable of being cured to a thermoset state.

The treatment of metal surfaces, especially ferrous metal surfaces, to provide them with protective, chemical coatings has long been known. Such coatings usually are provided by treatment with an acidic, inorganic chemical solution which reacts with the metal surface to provide an integral coating. Coatings of this type have the important advantage of being permanent, i.e., they cannot be removed by ordinary handling or minor abrasive wear. Another type of treatment to provide a protective surface coating involves the deposition of a residual film from a solution of a film-forming material in a relatively volatile solvent. In this case the resulting film is not attached chemically to the metal surface, as is the case above, and must, therefore, depend for its permanence on the attraction of physical forces. Although films of this type are not as permanent, they do have the important advantage of much more efficient applicaion, i.e., there is less loss of film-forming ingredients in the application of a film from a relatively volatile organic solvent than there is from the application of an integral chemically reacted film from an acidic solution.

It will be seen, thus, that while each of these types of protective films for metal surfaces enjoys a particular advantage, each suffers also from a disadvantage. The integral, chemically reacted film obtained from an aqueous acidic solution is inherently expensive because of the inefficiency of its application, and the residual film obtained from a solution in a relatively volatile organic solvent is not as permanent as it might be.

It is also frequently desired to impart an attractive color to a metal surface. This is especially true of fixtures used in homes and other buildings in places where they may be exposed and visible to those using the building.

A principal object of the present invention, therefore, is to provide novel liquid compositions suitable for use in providing protective films for metal surfaces.

Another object of the present invention is to provide a process for providing protective films for metal surfaces.

Still another object of the present invention is to provide treated metal surfaces which are resistant to deterioration with respect to corrosion such as rusting.

Still another object of the present invention is to provide attractive coatings for metal surfaces which are both permanent and susceptible to efficient application.

Other objects will in part be obvious and will in part appear hereinafter.

As indicated hereinabove, the compositions of the present invention contain a polymeric polyol, an epoxy resin, phosphoric acid, a phenol-aldehyde resin capable of thermosetting, and preferably the reaction product of phosphoric acid with an organic epoxide and a metal base. Ordinarily, it is convenient to employ a solution of said composition in one or more organic solvents. The type of solvent to be used will depend largely on the manner in which the composition is to be applied to the metal surface. When it is desired to coat the metal surface by immersion, relatively volatile solvents such as methyl isobutyl ketone, isobutyl alcohol, ethyl acetate and the like are preferred. When the composition is to be applied by spraying, either voltaile or non-volatile solvents may be used; thus, methyl isobutyl ketone, a volatile solvent, or ethylene glycol monobutyl ether, a relatively non-volatile solvent, may be used for spraying. In the case of brushing or roller coating it is preferable to use a non-volatile solvent. The substances used for solvents are generally oxygenated such as those illustrated above, although mixtures of oxygenated and hydrocarbon solvent often provide satisfactory results. The use of a solvent not only insures the ready solubility of all the ingredients of the coating composition, but also aids in the deposit of a thin, uniform protective film on the metal surface.

Component A in the compositions of this invention is, as indicated, a polymeric polyol. The term "polymeric polyol" is intended herein to include any polymeric composition which contains hydroxy groups. Examples of such compositions are polyvinyl alcohol, allyl alcohol polymers (especially copolymers with various unsaturated compounds), polyoxyalkylene compounds and the like. The preferred composition is a copolymer of allyl alcohol and a vinyl aromatic compound, which is preferably styrene but may be a substituted styrene such as chlorostyrene, alkyl-substituted styrenes and α-methylstyrene. Low molecular weight copolymers prepared from an approximately equimolar mixture of the two monomers are preferred. The molecular weight should preferably be about 500–2500.

Component B of the compositions of this invention is an epoxy resin. As used herein the term "epoxy resin" includes such compounds as the reaction product of two moles of epichlorohydrin with one mole of a polyhydric phenol such as bisphenol A and also includes higher condensation products derived therefrom. The phenols suitable for preparing these resins include, in general, all polyhydric phenols such as bisphenol A, resorcinol, hydroquinone, catechol, and similar compounds prepared from naphthalene or anthracene. In place of epichlorohydrin there may be used other halohydrins such as epibromohydrin or the epihalohydrins of mannitol, sorbitol, erythritol, glycerol and the like.

As for the phosphoric acid (component C), it is preferably 85% aqueous phosphoric acid. More concentrated solutions can be used, and in some instances it is preferable to use 100% phosphoric acid or even polyphosphoric acid. In other cases it is desirable to use less concentrated solutions such as 60% or 25% solutions. The more dilute solutions, however, sometimes cause solubility problems such as the formation of haze.

Component D of the compositions of this invention is a solid, curable phenol-aldehyde resin. These resins are formed by the reaction of phenol, cresols and the like with aldehydes such as formaldehyde, acetaldehyde and furfural and are well known in the art. The ones suitable for use in the present invention are those which can be cured to a thermoset state by baking and are, in general, what is known as "resitol" or "B-stage" resins. These are solid, linear substances containing active hydrogens on the phenol rings and methylol groups attached thereto. Upon heating, these groups inter-react to form a cured, crosslinked product which is insoluble and infusible. The important thing about the phenol-aldehyde resins used according to this invention is that they must be capable of such curing upon heating. Many products of this type are known to those skilled in the art, and it is believed unnecessary to unduly lengthen this specification by naming them.

To prepare the compositions of this invention, the ingredients and solvent are charged to a convenient vessel and heated until a homogeneous solution is obtained. The order of addition is not critical. Because the phenol-aldehyde resin is often difficult to dissolve, relatively prolonged heating at temperatures up to about 100° C. may be required.

The compositions of this invention are prepared from about 15–20 parts of component A, about 1–50 parts of component B, about 2–40 parts of component C, and about 20–60 parts of component D. Preferably, they contain 15–20 parts of A, 20–25 parts of B, 5–15 parts of C and 35–50 parts of D. Additional ingredients may also be added for special purposes. Among the most useful are silica and aqueous solutions of partially reduced chromic acid. The latter are exemplified by the compositions of U.S. Pat. 3,282,744 which consist essentially of a dilute aqueous solution of calcium dichromate and partially reduced chromic acid in which the ratio of hexavalent chromium to trivalent chromium is within the range from about 0.5 to about 5, preferably from about 0.8 to about 3, in which solution about 20–80 percent and preferably about 30–70 percent of the chromium content thereof is contributed by said partially reduced chromic acid.

Such dilute aqueous solution will generally contain a total of about 0.01–0.3 percent, and more often about 0.03–0.1 percent, or chromium.

It is known, as exemplified by U.S. Pats. 2,768,104 and 3,063,877, to reduce chromic acid partially by means of oxidizable compounds such as formaldehyde, ethanol, glycols and other polyalcohols, phenol, hydroquinone, potassium iodide, etc., and then to use a dilute solution of such partially reduced chromic acid as a corrosion-proofing composition. Example I of U.S. Pat. 3,063,877, for example, describes the preparation of a partially reduced chromic acid (ratio of hexavalent chromium to trivalent chromium: 1.27) by the reaction below 180° F. of a solution of chromic acid (prepared by dissolving 170 pounds of $CrO_3$ in 40 gallons of water) with a solution of 48 pounds of 36.6 percent aqueous formaldehyde in 21 gallons of water. From the standpoint of convenience and economy, however, it is generally preferred to use methanol as the reducing agent for chromic acid. The following examples are presented to illustrate additional specific modes of preparing partially reduced chromic acid useful for the purposes of the present invention. Unless otherwise indicated, all parts and percentages are by weight.

EXAMPLE 1

432 parts of water is introduced into a reaction vessel and 550 parts of $CrO_3$ is added thereto over a period of 20 minutes at 27–32° C. The whole is heated to 93° C. over a period of 1.5 hours and a mixture of 29 parts of methanol with 29 parts of water is added thereto beneath the surface of the chromic acid solution over a period of 4 hours at 90–99° C. A very exothermic reaction occurs and the addition must be made carefully to avoid a too vigorous reaction. Approximately 40 parts of carbon dioxide is formed as a consequence of the complete oxidation of the methanol. After all of the methanol has been added, the whole is stirred for 1 hour at 96° C. The product, a concentrated aqueous solution of partially reduced chromic acid, shows the following analyses.

Percent chromium _____ 28.45
Percent hexavalent chromium _____ 19.55
Percent trivalent chromium _____ 8.90
Ratio of hexavalent chromium to trivalent chromium _____ 2.2

EXAMPLE 2

To 1100 grams of $CrO_3$ dissolved in 2500 grams of water and heated to 90–100° C., there is added dropwise a mixture of 128 grams of methanol and 128 grams of water. The highly exothermic reaction maintains the temperature at 90–100° C. After all of the aqueous methanol has been added (approximately 8 to 10 hours required), the whole is stirred for an additional hour to insure complete reaction. The material in the reaction vessel is then diluted with sufficient water to yield 3 liters of solution. The resulting product, a concentrated aqueous solution of partially reduced chromic acid, shows the following analyses.

Percent chromium _____ 14.75
Ratio of hexavalent chromium to trivalent chromium _____ 1.15

EXAMPLE 3

An experiment is carried out in the same manner set forth in Example 2, except that a mixture of 89.6 grams of methanol and 89.6 grams of water is employed. The resulting product, a concentrated aqueous solution of partially reduced chromic acid, shows the following analyses.

Percent chromium _____ 14.9
Ratio of hexavalent chromium to trivalent chromium _____ 1.68

EXAMPLE 4

An experiment is carried out in the same manner set forth in Example 2, except that a mixture of 48 grams of methanol and 48 grams of water is employed. The resulting product, a concentrated aqueous solution of partially reduced chromic acid, shows the following analysis.

Percent chromium _____ 15.45
Ratio of hexavalent chromium to trivalent chromium _____ 3.0

The other active ingredient of the compositions of U.S. Pat. 3,282,744 is calcium dichromate. Although anhydrous calcium dichromate ($CaCr_2O_7$) may be employed, it is generally more convenient to use a concentrated aqueous solution thereof, because such solution dissolves immediately in water upon mixing. For example, the reaction of a slurry of 1.72 parts of calcium hydroxide in 6.5 parts of water with 5.1 parts of $CrO_3$ for about 8 hours at 110°–120° F. yields an aqueous concentrate containing 45 percent of calcium dichromate.

The dilute aqueous solution of the above-identified ingredients will ordinarily contain from about 0.01 to about 0.3 percent of chromium. Preferably, the chromium content of the solution will be about 0.03–0.1 percent. It is important that about 20–80 percent and preferably about 30–70 percent of the chromium content of the solution be contributed by said partially reduced chromic acid. It is likewise important that the ratio of hexavalent chromium to trivalent chromium in said partially reduced chromic acid be within the range from about 0.5 to about 5, preferably from about 0.8 to about 3.

A number of specific examples of aqueous corrosion-proofing compositions of this invention are given in the following table. They are prepared by simply dissolving the indicated components in water.

| | Partially reduced chromic acid | | |
|---|---|---|---|
| Example | Identity | Present in an amount to supply the indicated percent of chromium | Calcium dichromate, present in an amount to supply the indicated percent of chromium |
| 5 | Prod. of Ex. 2 | 0.025 | 0.025 |
| 6 | Prod. of Ex. 3 | 0.025 | 0.025 |
| 7 | Prod. of Ex. 4 | 0.025 | 0.025 |
| 8 | Prod. of Ex. 2 | 0.05 | 0.025 |
| 9 | Prod. of Ex. 3 | 0.075 | 0.025 |
| 10 | Prod. of Ex. 4 | 0.03 | 0.09 |
| 11 | Prod. of Ex. 2 | 0.09 | 0.18 |
| 12 | Prod. of Ex. 3 | 0.08 | 0.08 |

Another extremely useful additional constituent with the compositions of this invention is a reaction product of phosphoric acid, an epoxide and a metal base. Compositions containing this ingredient are disclosed and claimed in the copending application of John W. Forsberg, filed of even date herewith.

The following examples illustrate the preparation of the compositions of this invention.

EXAMPLE 13

A solution of 200 grams of a copolymer of equimolar proportions allyl alcohol and styrene, with a molecular weight of about 1580, in 205.5 grams of ethylene glycol monobutyl ether is heated to 50° C. and 210 grams of an epoxy resin identified as "Epotuf RE–6501," prepared from bisphenol A and epichlorohydrin, is added. There is then added over 13½ hours 82.7 grams of 85% phosphoric acid. The mixture is heated at 48° C. for an additional 2 hours.

To 145 grams of the product thus obtained is added 386 grams of a 1:1 (by weight) mixture of ethylene glycol monobutyl ether and a high-boiling (about 150° C.) organic solvent. There are then added 10 grams of a phenolic baking resin sold under the commercial designation "Bakelite BKR–2620." The mixture is stirred and heated until it is homogeneous. The product contains non-volatile constituents amounting to 20 parts by weight of A, 21 parts of B, 7 parts of C and 4.8 parts of D.

EXAMPLES 14–16

A series of compositions is prepared by mixing a 50% solution in ethylene glycol monobutyl ether of the styrene-allyl alcohol copolymer of Example 13 a 40% solution in 4-methoxy-4-methyl-2-pentanone of "Bakelite BKR–2620," a 75% solution in a 2:1 (by weight) mixture of methyl isobutyl ketone and xylene of "Epotuf RE–6501," and 85% phosphoric acid. To each of the compositions is then added a 3:1 (by weight) mixture of 4-methoxy-4-methyl-2-pentanone and diethylene glycol monobutyl ether, and finely divided silica in an amount equal to 10% by weight of the non-volatile constituents. The final products contain the essential ingredients and non-volatile matter in the amounts shown in the following table.

| Example | Percent non-volatile matter | Parts by weight | | | |
|---|---|---|---|---|---|
| | | Comp. A | Comp. B | Comp. C | Comp. D |
| 14 | 55 | 15 | 50.3 | 13.7 | 50.3 |
| 15 | 40.7 | 20 | 12 | 5.3 | 12.4 |
| 16 | 55 | 20 | 19.3 | 8.5 | 32.2 |

Before use for coating metals, these compositions are diluted to about 17–19% non-volatile matter.

EXAMPLE 17

A solution is prepared from 146.5 grams of the styrene-allyl alcohol copolymer of Example 13, 299 grams of "Epotuf RE–6501" (75% in a 2:1 mixture of methyl isobutyl ketone and xylene), 115 grams of 85% phosphoric acid, and 146.5 grams of diethylene glycol monobutyl ether. To 283 grams of this mixture is added 344 additional grams of diethylene glycol monobutyl ether and 146 grams of a 40% solution of "Bakelite BKR–2620" in 4-methoxy-4-methyl-2-pentanone. Finally, 16 grams of finely divided silica is dispersed in 450 grams of the product. The resulting composition contains 20 parts of component A, 31.3 parts of B, 8.5 parts of C, and 20.4 parts of D and has a non-volatile matter content of 34.2%. Before use, it is diluted (e.g., with the mixture of 4-methoxy-4-methyl - 2 - pentanone and diethylene glycol monobutyl ether described in Examples 14–16) to about 18% non-volatile matter.

The compositions of this invention are normally applied to metal surfaces by dipping, spraying, brushing or roller-coating. The coating is then baked at a temperature of about 100–400° C. until dry. The compositions of this invention impart an attractive color to the metal surface; the shade depends upon the length of baking time and the temperature of baking and may vary from gold to dark walnut. Apparently, the degree of curing of the phenolic resin constituent governs the color. It is not apparent that variation in baking time appreciably effects the degree of adhesion of the coating to the metal, and therefore the baking time may be chosen to provide a surface of the desired color.

Metal surfaces coated with compositions of this invention, followed by a siccative organic topcoat, have excellent resistance to severe physical and chemical conditions. Alternatively, the surfaces may be coated with the compositions of this invention alone and then baked to impart the attractive color referred to hereinabove.

What is claimed is:

1. A liquid composition of matter, suitable for providing a protective film on a metal surface, which comprises (A) about 15–20 parts by weight of a copolymer of allyl alcohol and a vinyl aromatic compound, (B) about 1–50 parts of an epoxy resin, (C) about 2–40 parts of phosphoric acid, and (D) about 5–60 parts of a solid phenolaldehyde resin which is capable of being cured to a thermoset state.

2. The composition of claim 1 wherein component A is a copolymer of allyl alcohol with styrene.

3. A metal article carrying on its surface a protective coating formed by applying thereto the composition of claim 1 and baking said composition on the metal surface at a temperature of about 100–400° C.

4. A metal article according to claim 3 which has been further coated with a siccative organic topcoat.

5. A metal article carrying on its surface a protective coating formed by applying thereto the composition of claim 2 and baking said composition on the metal surface at a temperature of about 100–400° C.

6. A metal article according to claim 5 which has been further coated with a siccative organic topcoat.

References Cited

UNITED STATES PATENTS 2,699,413   1/1955   Seagren et al. _____ 148—6.15
3,133,838   5/1964   Higgins _____ 148—6.15

RALPH S. KENDALL, Primary Examiner

U.S. Cl. X.R.

148—6.16; 260—831, 844